United States Patent
Mechaley, Jr.

(10) Patent No.: US 8,095,163 B2
(45) Date of Patent: Jan. 10, 2012

(54) SYSTEM AND METHOD FOR PUSH-TO-TALK COMMUNICATION IN AN ORTHOGONAL FREQUENCY DIVISION MULTIPLEXED COMMUNICATION SYSTEM

(75) Inventor: Robert G. Mechaley, Jr., Kirkland, WA (US)

(73) Assignee: MobileSphere Holdings LLC, Kirkland, WA (US)

( * ) Notice: Subject to any disclaimer, the term of this patent is extended or adjusted under 35 U.S.C. 154(b) by 85 days.

(21) Appl. No.: 12/695,919

(22) Filed: Jan. 28, 2010

(65) Prior Publication Data

US 2010/0197334 A1    Aug. 5, 2010

Related U.S. Application Data

(60) Provisional application No. 61/150,200, filed on Feb. 5, 2009.

(51) Int. Cl.
*H04B 7/00* (2006.01)
*H04L 27/28* (2006.01)

(52) U.S. Cl. ............... 455/518; 455/519; 455/452.1; 455/509

(58) Field of Classification Search ............ 455/518, 455/517, 519, 515, 509, 452.1, 452.2, 447, 455/450; 370/329; 375/260
See application file for complete search history.

(56) References Cited

U.S. PATENT DOCUMENTS

| | | | |
|---|---|---|---|
| 2006/0205396 A1* | 9/2006 | Laroia et al. | 455/422.1 |
| 2007/0149238 A1* | 6/2007 | Das et al. | 455/522 |
| 2008/0165866 A1 | 7/2008 | Teo et al. | |
| 2008/0181319 A1* | 7/2008 | Kao et al. | 375/260 |
| 2008/0200198 A1 | 8/2008 | Zhang | |
| 2009/0016311 A1 | 1/2009 | Wu et al. | |

* cited by examiner

*Primary Examiner* — John J Lee
(74) *Attorney, Agent, or Firm* — Michael J. Donohue; Davis Wright Tremaine LLP

(57) ABSTRACT

A system to permit push-to-talk communications in an orthogonal frequency division multiplexed (OFDM) communication network. Individual wireless communication devices that are part of a Group Call are assigned the same set or sets of OFDM tones for a downlink timeslot. Because each wireless communication device receives the same set of tones, each device will receive a communication simultaneously. The assigned OFDM tones need not be contiguous within a block of available tones. Because a large number of OFDM tones are available, the concept may be extended to a large number of groups that each separately support a Group Call function.

24 Claims, 4 Drawing Sheets

SYSTEM AND METHOD FOR PUSH-TO-TALK COMMUNICATION IN AN ORTHOGONAL FREQUENCY DIVISION MULTIPLEXED COMMUNICATION SYSTEM

BACKGROUND OF THE INVENTION

1. Field of the Invention

The present invention is directed generally to communication systems and, more particularly, to techniques for a push-to-talk communication system in an orthogonal frequency division multiplexed network.

2. Description of the Related Art

Public wireless networks, which usually have wide and ubiquitous coverage, can be useful in providing private network-type capabilities. Public networks based on iDEN technology, for example, offer the ability to provide push-to-talk capabilities similar to those in a private land mobile two-way network without the cost of building such a network.

The difficulty in providing two-way like services on a public wireless network, such as GSM, TDMA, and the like, is synchronization of all mobile units so that all mobile units receive a message simultaneously. It is important for this Group Call function to be synchronized so that all units can act on a command at the same time. For example, a SWAT team preparing to simultaneously enter the front and back entrances of a building would want both entry teams to receive the commands to enter at exactly the same time. This simultaneity has been an issue for networks that use data packet technologies. Variations in data packet timing across the network and over the airlink make simultaneous reception unpredictable. Some systems attempt to synchronize transmissions by establishing a phone call and conferencing all the mobile units together. This technique is limited by the amount of time it takes to establish the phone call so that while communication is simultaneous, the setup of the call means a lag between pushing the button to talk and the actual establishment of the communication path. Neither of these techniques accurately replicates the experience of push-to-talk on a private two-way network.

The iDEN system remedied the drawbacks of traditional public wireless networks by placing all receiving units for a Group Call in receive mode at the same time. The iDEN network uses a time division technique which divides all communications into slices of time called timeslots. By directing all of the mobile units in a Group Call into a single timeslot containing the communications, all units receive the same communications at the same instant.

Such techniques are not applicable to other forms of communication. Specifically, it can be appreciated that there is a significant need for a system and method for push-to-talk communication in an orthogonal frequency division multiplexed system. The present invention provides this, and other advantages, as will be apparent from the followed detailed description and accompanying figures.

BRIEF DESCRIPTION OF THE SEVERAL VIEWS OF THE DRAWING(S)

DETAILED DESCRIPTION OF THE INVENTION

Orthogonal frequency division multiplex (OFDM) communications systems utilize a large number of closely-spaced sub-carriers to transmit data. The input data is divided into a number of parallel data streams, one for each sub-carrier. Each sub-carrier is then modulated using a conventional modulation scheme, such as phase shift keying (PSK), quadrature amplitude modulation (QAM), or the like. The sub-carriers are orthogonal to each other to prevent intercarrier interference. Those skilled in the art will appreciate that OFDM technology has developed into a popular communication technique for wideband wireless communication.

During a call setup process, a set of tones or groups of tones (i.e., sub-carrier channels) are assigned to a particular mobile unit. The assignment of tones to a particular mobile unit during a channel set up operation and the actual communication process between a mobile unit and base station is well known in the art and need not be described in greater detail herein. However, the techniques described herein enable mobile units utilizing OFDM technology to be synchronized such that communications in a push-to-talk system are received simultaneously by all group members.

Figure 1:
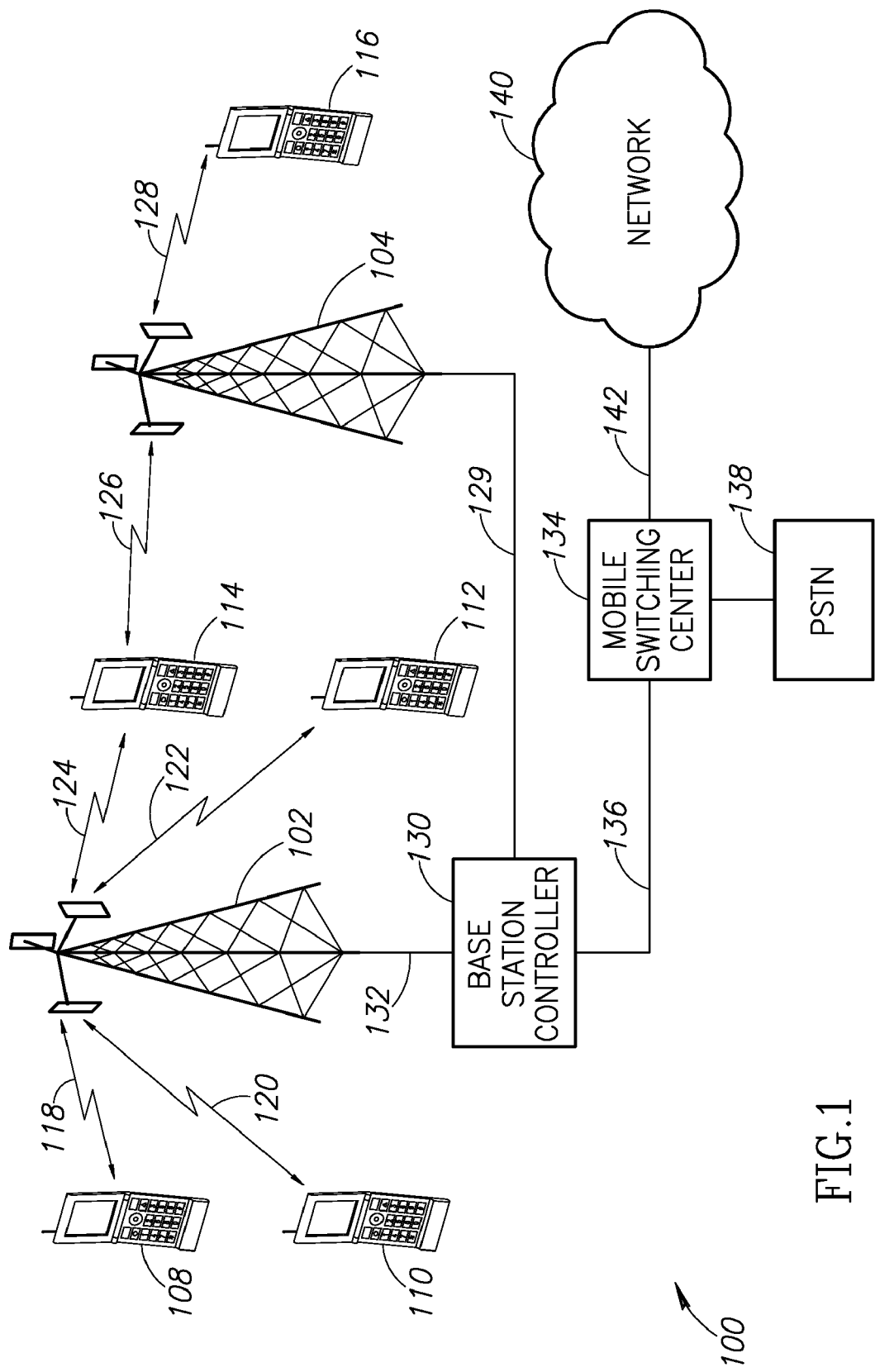
FIG. 1 illustrates an exemplary communication architecture used to implement a communication network in accordance with the present teachings.

The communication techniques are implemented by a system 100 illustrated in FIG. 1. A base station 102 communicates with a plurality of wireless communication devices 108-114 via wireless communication links 118-124, respectively. Thus, the wireless communication devices 108-114 are all within the coverage area of the base station 102. The wireless communication device 114 is also within the coverage area of a base station 104. The wireless communication device 114 can communicate with the base station 104 via a wireless communication link 126. Also illustrated in FIG. 1 is a wireless communication device 116, which communicates with the base station 104 via a wireless communication link 128. The process of assigning OFDM tones or groups of tones to each of the wireless devices (e.g., the wireless communication device 108) and the actual communication between the wireless communication devices 108-114 and the base station 102 are well-known in the art and need not be described in greater detail herein.

The base station 102 is communicatively coupled to a base station controller 130 via a communication link 132. In a typical embodiment, the base station controller 130 may provide operational control for one or more base stations 102. As illustrated in FIG. 1, the base station 104 is also coupled to the base station controller 130 via a communication link 129. Those skilled in the art will appreciate that a typical wireless communication network will have a large number of base stations that each communicate with a large number of wireless devices. For the sake of clarity, only two base stations (i.e., the base stations 102 and 104) and a few wireless communication devices (i.e., the wireless communication devices 108-116) are illustrated in FIG. 1.

In turn, the base station controller 130 is coupled to a mobile switching center (MSC) 134 via a communication link 136. As is known in the art, the MSC 134 is typically coupled to a large number of base station controllers and is responsible for switching and routing of calls to other base stations and/or a telephone network, such as the public switched telephone network (PSTN) 138.

The MSC 134 may also provide access to a core network 140 via a communication link 142. The core network 140 is the central part of a communication network that may include a number of functions, such as authorization, billing and the like. In addition, the network 140 may provide access to other networks, such as the Internet, for web applications via one or more gateways (not shown).

The MSC 134 is commonly used in circuit-switched networks. For packet-switched networks, a set of equivalent functions may be provided based on TCP/IP and VoIP technologies. The specific form of network elements may vary based on implementation details. However, those skilled in the art will understand that the OFDM implementation of the present teachings may be applicable to a variety of network architectures.

FIG. 1 is simplified to illustrate the operation of the system 100 with a group of wireless communication devices communicating in proximity with each other. In the illustrated embodiment, the wireless communication devices 108-114 are all communicating with the same base station (i.e., the base station 102). However, those skilled in the art will appreciate that the wireless communication devices 108-114 may communicate with other base stations as well. For example, the wireless communication device 114 is capable of communicating with the base station 102 via the wireless communication link 124 or communicating with the base station 104 via the wireless communication link 126. For the sake of simplicity, FIG. 1 also eliminates a number of conventional network elements, such as gateways, firewalls, and other control elements that are not pertinent to a clear understanding of the present teachings.

Figure 2:
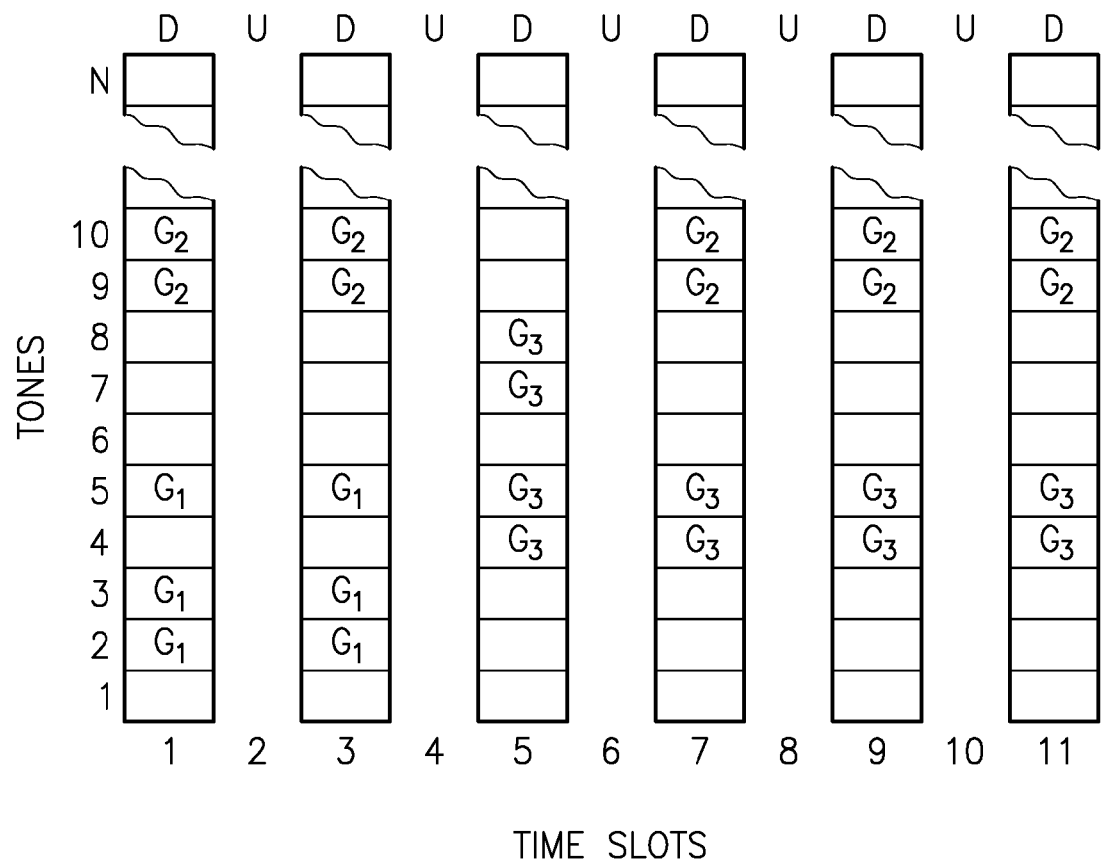
FIG. 2 illustrates frequency allocation in an orthogonal frequency division multiplexed system.

A plurality of mobile communication devices may be designated for operation in a Group Call function. When individual mobile communication units are designated as part of the same group, the wireless communication devices of that group will all be assigned the same OFDM tones for communication purposes. FIG. 2 illustrates a number of uplink and downlink timeslots and the designation of the tones to various groups. In the example illustrated in FIG. 2, a group of wireless communication devices (e.g., the wireless communication devices 108-110 are designated as Group1. As illustrated in FIG. 2, the wireless communication devices of Group1 are assigned tones 2, 3, and 5 in downlink timeslots 1 and 3. It should be noted that the assigned tones need not be contiguous. Furthermore, the number of tones assigned to a particular group can vary dynamically based on bandwidth requirements for the particular communication application. That is, simple audio communication may require less bandwidth than other forms of data communication, such as streaming video.

Also illustrated in FIG. 2, is a second set of tones assigned to Group2 (e.g., the wireless communication devices 112-116). In this example, the wireless communication devices of Group2 are assigned tones 9 and 10 in downlink time slots 1, 3, 7, 9, and 11. All wireless communication devices that are in a particular sector, cell, or area that identify it as a member of a certain group will receive a Group Call and are assigned the same set of OFDM tones within each timeslot on the downlink (those skilled in the art will appreciate that the downlink is conventionally considered the communication from the base station 102 to the wireless communication devices). Thus, in the example described herein, the wireless communication devices 108-110, which are assigned to Group1 will all have the same OFDM tones assigned to each mobile unit.

The information for each group is encoded in a conventional fashion using the assigned tones. When the base station transmits the encoded information using the assigned tones for a group, all members in that Call Group will receive the information simultaneously. Thus, the techniques may be used to support a push-to-talk system in an OFDM communication network.

The concept illustrated herein is shown in FIG. 2 in a very simplified form with a relatively small number of tones assigned to individual ones of the groups (e.g., Group1, Group2, and Group3). However, a typical OFDM wave form contains hundreds or thousands of tones. This advantageously allows a large number of Group Calls to be supported simply by directing the appropriate wireless communication devices in each group to receive the appropriate tones or sets of tones assigned to that group. Again, FIG. 2 illustrates a simplistic version with only three groups set up with a relatively small number of tones assigned to each group. However, the principles described herein can be extended to a large number of groups.

FIG. 1 illustrates the wireless communication devices (e.g., the wireless communication devices 108-110) in a group (e.g., Group1) as communicating with a single base station. However, the principles of the present disclosure permit group members to be coupled to different base stations. In the example of the SWAT team described above, the actual team members may communicate with a single base station or with multiple base stations if the operational area for the SWAT team is a large geographical area. In addition, a command post, for example, may be established at some distance from the theater of operations. Thus, it is possible that the command post wireless communication device may be in communication with a different base station. In the example of FIG. 1, the wireless communication device 116 may be part of Group1. Even though the wireless communication device 116 communicates with the base station 104, it will receive all communications transmitted to the members of Group1. Those skilled in the art will appreciate that the frequency or subcarrier of the OFDM tones may differ from the base station 102 to the base station 104. That is, the members of Group1 communicating with the base station 102 may be assigned a first set of OFDM tones while the members of Group1 communicating with the second base station may be assigned a second set of OFDM tones that may be the same or different from the first set of OFDM tones. However, the system 100 can identify members of a group communicating with different base stations as members of the same group even though the different base stations may have assigned different set of OFDM tones to the respective wireless communication devices communicating therewith. Similarly, wireless communication devices in a single group may be communicating with the same base station, but with a different sector of that base station. In this fashion, all members of a designated group, whether coupled to the same sector or base station or coupled to different sectors or completely different base stations, can still be configured to simultaneously receive communications from other group members.

Figure 3:
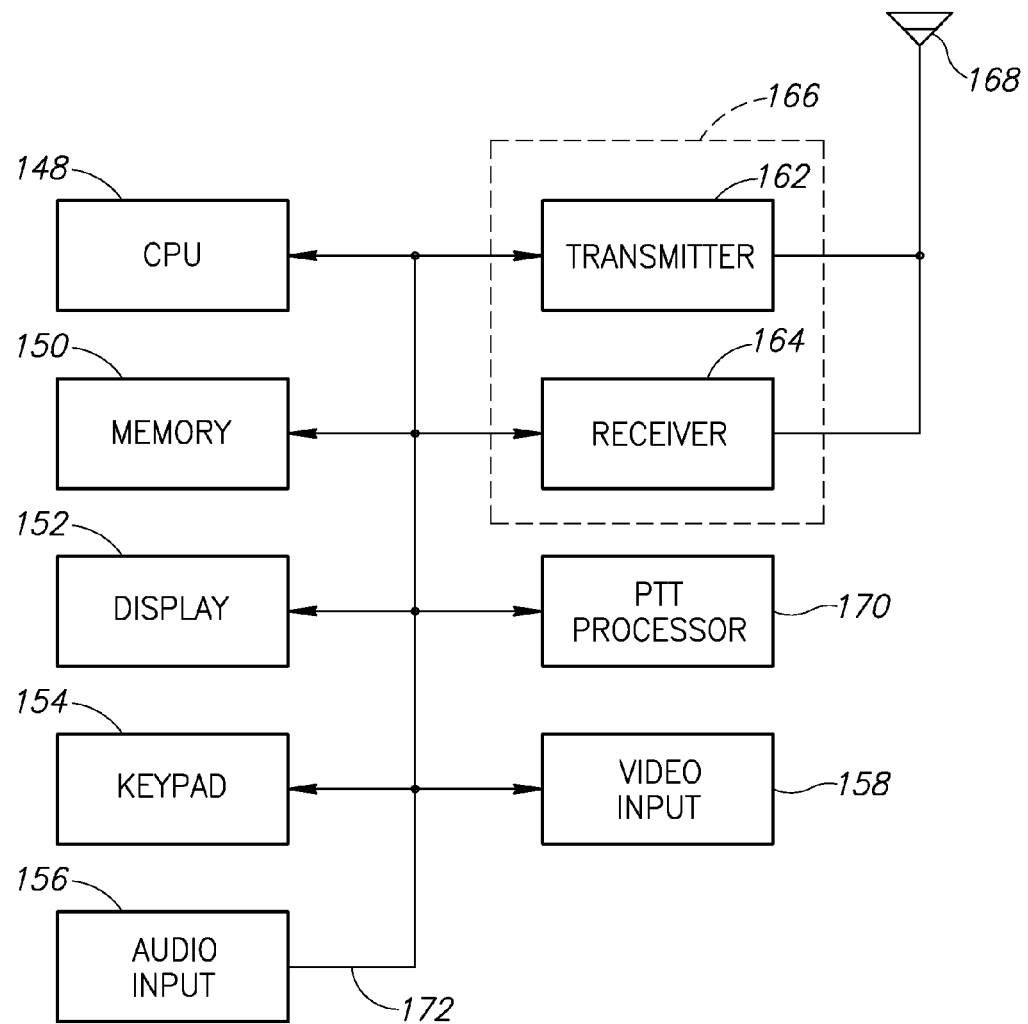
FIG. 3 is a functional block diagram of a wireless communication device constructed in accordance with the present teachings.

FIG. 3 is a functional block diagram of an electronic device, such as the wireless communication devices 108-114 in FIG. 1. The device includes a central processing unit (CPU) 148. Those skilled in the art will appreciate that the CPU 148 may be implemented as a conventional microprocessor, application specific integrated circuit (ASIC), digital signal processor (DSP), programmable gate array (PGA), or the like. The wireless communication device 108 is not limited by the specific form of the CPU 148.

The electronic device in FIG. 3 also contains a memory 150. The memory 150 may store instructions and data to control operation of the CPU 148. The memory 150 may include random access memory, ready-only memory, programmable memory, flash memory, and the like. The electronic device is not limited by any specific form of hardware used to implement the memory 150. The memory 150 may also be integrally formed in whole or in part with the CPU 148.

The electronic device of FIG. 3 also includes conventional components, such as a display 152, keypad or keyboard 154 and audio input device 156. The electronic device may also include a video input 158, such as a conventional built-in camera that is common in many wireless electronic devices. These are conventional components that operate in a known manner and need not be described in greater detail.

The electronic device of FIG. 3 also includes a transmitter 162 such as may be used by the wireless communication device 108 for normal wireless communication with the base station 102 (see FIG. 1). FIG. 3 also illustrates a receiver 164 that operates in conjunction with the transmitter 162 to communicate with the base station 102. In a typical embodiment, the transmitter 162 and receiver 164 are implemented as a transceiver 166. The transceiver 166 is connected to an antenna 168. Operation of the transceiver 166 and the antenna 168 is well-known in the art and need not be described in greater detail herein.

The wireless communication device in FIG. 23 also includes a push-to-talk (PTT) processor 170. The PTT processor 170 controls operation of the wireless communication device in a Group Call mode. The PTT processor 170 includes a PTT button (not shown) which, when activated by the user, places the device in a transmit mode such that outgoing communications from the PTT activated device will be transmitted, via the base station 102, to the wireless communication devices of the other group members.

Those skilled in the art will recognize that the PTT processor 170 may be implemented as a series of computer instructions stored in the memory 150 and executed by the CPU 148. However, the PTT processor 170 is shown as a separate block in the functional block diagram of FIG. 3 because it performs a separate function.

The various components illustrated in FIG. 3 are coupled together by a bus system 172. The bus system may include an address bus, data bus, power bus, control bus, and the like. For the sake of convenience, the various busses in FIG. 3 are illustrated as the bus system 172.

Figure 4:
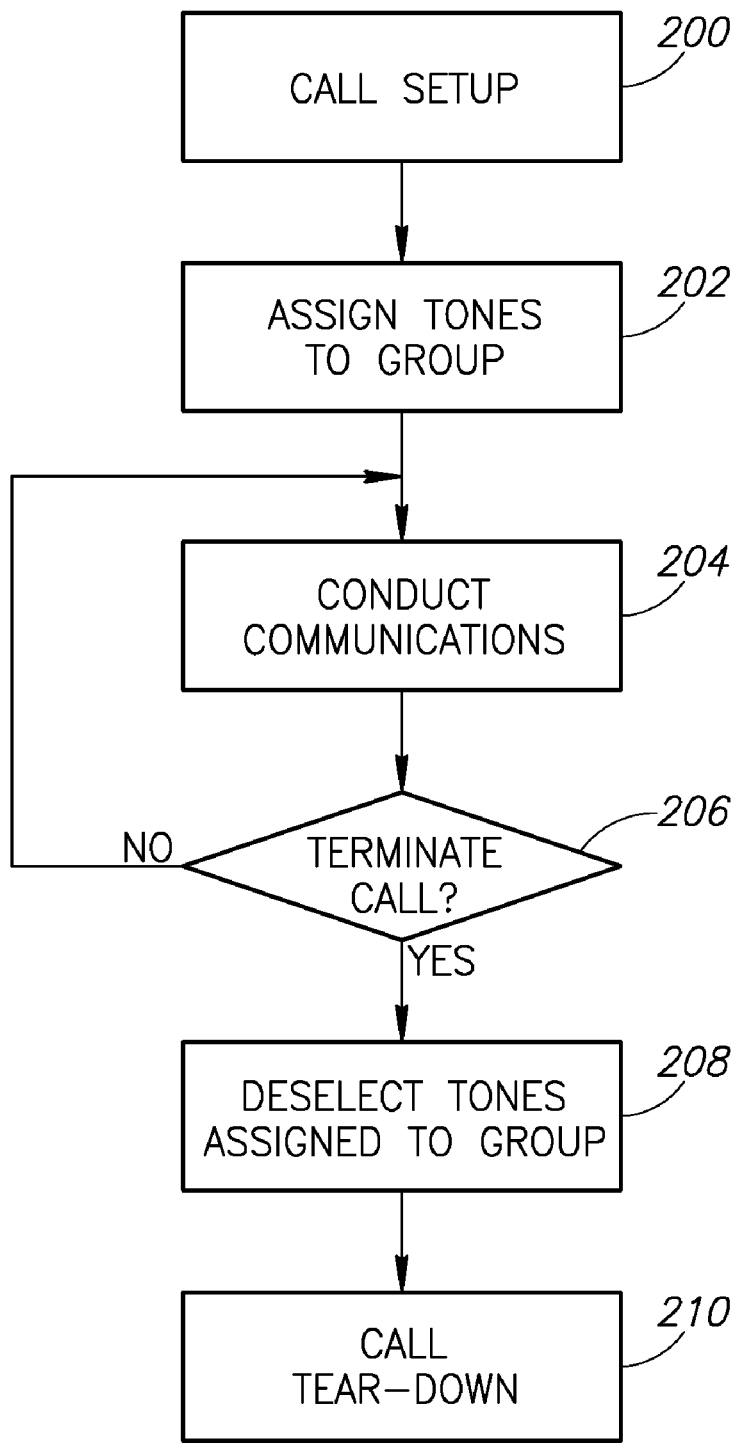
FIG. 4 is a flowchart illustrating the operation of the system of FIGS. 1 and 2.

The operation of the system 100 is illustrated in the flow chart of FIG. 4. At step 200 the system 100 performs a call setup operation. In a typical group call arrangement, once a group call is set up, it is usually maintained for some predetermined or reserved time that is renewed each time a member of the group continues to communicate. If the predetermined or reserved period of time lapses with no group communication, the resources may be released and a call tear-down process initiated. Alternatively, it is possible to perform a call set-up and tear-down operation each time a push-to-talk button is activated by one of the group members. While the latter process may free OFDM tones for use in between communications by group members, there may be added overhead to set up and tear down the call each time a button is depressed. As those skilled in the art will appreciate, each time the call is set up, the OFDM tone or tones must be assigned to all group members. However, the present disclosure is intended to encompass either method.

During the course of the communication, additional group members may be added. The call set up process described in step 200 above may be applied to additional wireless communication devices. If the additional wireless communication device is to be added to a group (e.g. Group1), that wireless communication device is assigned the same group of OFDM tones as previously assigned to Group 1.

In step 202, the system 100 assigns tones to a designated group (e.g., Group1). In step 204, the group conducts communications in a conventional fashion. On the uplink, any group member can initiate a transmission by depressing the push-to-talk button on the wireless communication device. The message is transmitted to the base station and relayed to all other group members in the manner described above. If group members are connected to other base stations (e.g., the base station 104), the message is relayed through the communications system backhaul from the base station 102 to the base station 104 for transmission to group members coupled to that base station.

If sufficient spectral resources are available, the system 100 can assign a different set of OFDM tones to use on the uplink for each of the wireless communication devices within a group. This is referred to as a contention-free uplink because each of the wireless communication devices has an independent uplink to the base station (e.g., the base station 102). The base station will relay the message received on the uplink from one of the wireless communication devices to all of the group members in the manner described above. If multiple wireless communication devices send messages to one or more base stations on their respective uplinks, the system 100 can digitally mix the multiple uplink messages and transmit the combined messages on the shared downlink. This effectively provides a conference call between group members where one or more persons may speak at the same time.

Alternatively, if resources are scarce, it is possible to use a contention-based system in which group members must compete for available time on the uplink. If group members attempt to communicate simultaneously, the base station controller detects the collision and signals back to the wireless communication units in the group and a lock out tone is generated. The lock out tone alerts the users that simultaneous access attempts were made and that users should listen before talking and pace their access attempts. Because the collision detection and lock out tone generation happens so quickly, it appears that the lock out tone is generated as the user presses the push-to-talk-button on the wireless communication device. On the downlink, the base station (e.g., the base station 102) transmits data using an assigned set of OFDM tones. However, because each of the wireless communication devices in the designated group all have identical sets of OFDM tones assigned for the downlink, each group member will receive downlink communications simultaneously.

In step 206, the system determines if the call has been terminated. If the call is not terminated, the result of decision 206 is NO and the process returns to step 204 to continue conducting communications.

If the call is terminated, the result of decision 206 is YES and, in step 208, the system deselects tones assigned to the group. This makes the tones available for other network operations. In step 210, the system conducts a call teardown operation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An orthogonal frequency-division multiplexed (OFDM) wireless communication system comprising:
   a plurality of OFDM wireless communication devices;
   a first base station configured to communicate with selected ones of the plurality of OFDM wireless communication devices as a first group using a first set of OFDM tones; and
   a first base station controller configured to instruct the selected ones of the plurality of OFDM wireless communication devices to receive data from the first base station using the first set of OFDM tones wherein the selected ones of the plurality of OFDM wireless communication devices receives data from the first base station as a group communication.

2. The system of claim 1 wherein the first set of OFDM tones are selected from a set of available OFDM tones and are non-contiguous OFDM tones.

3. The system of claim 1 wherein the number of OFDM tones in the first set of OFDM tones is selected based on a bandwidth requirement for the group communication.

4. The system of claim 3 wherein the number of OFDM tones in the first set of OFDM tones is altered if the bandwidth requirement for the group communication changes where additional OFDM tones are added to the first set of OFDM tones if the bandwidth requirement for the group communication increases and OFDM tones are removed from the first set of OFDM tones if the bandwidth requirement for the group communication decreases.

5. The system of claim 1 wherein the first base station controller is further configured to instruct an additional OFDM wireless communication device, other than the selected ones of the plurality of OFDM wireless communication devices, to receive data from the first base station using the first set of OFDM tones wherein the additional OFDM wireless communication device uses the first set of OFDM tones receive data from the first base station as part of the first group.

6. The system of claim 1 wherein the first base station receives a communication from one of the plurality of OFDM wireless communication devices and transmits the communication using the first set of OFDM tones whereby the first group of OFDM wireless communication devices receives the message from the one wireless communication device as a group.

7. The system of claim 6, further comprising a push-to-talk button on the one wireless communication device to initiate transmission of the message to the first base station.

8. The system of claim 1, further comprising:
   a second base station configured to communicate with a portion of the plurality of OFDM wireless communication devices within a coverage range of the second base station as part of the first group, the second base station using a second set of OFDM tones; and
   a second base station controller configured to instruct the portion of the plurality of OFDM wireless communication devices to receive data from the second base station using the second set of OFDM tones wherein the portion of the plurality of OFDM wireless communication devices using the second set of OFDM tones receive data from the second base station as part of the first group.

9. The system of claim 8 wherein one of the first base station and the second base station receives a communication from one of the OFDM wireless communication devices in the first group and transmits the communication to the other of the first base station and the second base station, the first base station being further configured to transmit the communication to the selected ones of the plurality of OFDM wireless communication devices using the first set of OFDM tones and the second base station being further configured to transmit the communication to the portion of the plurality of OFDM wireless communication devices within the coverage range of the second base station using the second set of OFDM tones whereby the first group of OFDM wireless communication devices receives the message from the one wireless communication device as a group.

10. The system of claim 8 wherein the first set of OFDM tones and the second set of OFDM tones are the same set of OFDM tones.

11. The system of claim 8 wherein the first base station controller and the second base station controller are portions of the same base station controller.

12. The system of claim 1 wherein one of the plurality of OFDM wireless communication devices in the call group is configured to transmit a communication to a base station receiver and the others of the plurality of wireless communication devices in the call group are configured to receive from a base station transmitter as a group.

13. The system of claim 12, further comprising a push-to-talk button on the one of the plurality of OFDM wireless communication devices in the call group to initiate transmission of the message to the base station receiver.

14. The system of claim 12 wherein the base station receiver and the base station transmitter are portions of the same base station.

15. An orthogonal frequency-division multiplexed (OFDM) wireless communication system for communicating with a plurality of OFDM wireless communication devices, the system comprising:
　a first base station configured to communicate selected ones of the plurality of OFDM wireless communication devices as a first group using a first set of OFDM tones; and
　a first base station controller configured to instruct the selected ones of the plurality of OFDM wireless communication devices to receive data from the first base station using the first set of OFDM tones wherein the selected ones of the plurality of OFDM wireless communication devices receive data from the base station as a group communication.

16. The system of claim 15 wherein the first set of OFDM tones are selected from a set of available OFDM tones and are non-contiguous OFDM tones.

17. The system of claim 15 wherein the first base station controller is further configured to instruct an additional OFDM wireless communication device, other than the selected ones of the plurality of OFDM wireless communication devices, to receive data from the first base station using the first set of OFDM tones wherein the additional OFDM wireless communication device uses the first set of OFDM tones receive data from the first base station as part of the first group.

18. An orthogonal frequency-division multiplexed (OFDM) wireless communication system comprising:
　a plurality of wireless communication devices in a call group, each having:
　　an OFDM transmitter configured to transmit data; and
　　an OFDM receiver configured to receive data using a plurality of OFDM sub-carrier channels wherein each of the plurality of wireless communication devices in the call group is configured to receive commands specifying the plurality of OFDM channels wherein the OFDM receiver in each of the plurality of wireless communication devices in the call group uses the same plurality of OFDM channels.

19. A method for communication using orthogonal frequency-division multiplexed (OFDM) wireless communication to communicate with a plurality of OFDM wireless communication devices, the method comprising:
　receiving a request to establish a group call between selected ones of the plurality of OFDM wireless communication devices;
　instructing the selected ones of the plurality of OFDM wireless communication devices to receive group call data using a first set of OFDM tones wherein each of the selected ones of the plurality of OFDM wireless communication devices participating in the group call is configured to use the first set of OFDM tones to receive the group call data; and
　receiving the group call data using the first set of OFDM tones.

20. The method of claim 19 wherein the first set of OFDM tones are selected from a set of available OFDM tones and are non-contiguous OFDM tones.

21. The method of claim 19, further comprising
　instructing an additional OFDM wireless communication device, other than the selected ones of the plurality of OFDM wireless communication devices, to receive data using the first set of OFDM tones wherein the additional OFDM wireless communication device participates in the group call.

22. The method of claim 19 wherein a first portion of the selected ones of the plurality of OFDM wireless communication devices are within a coverage range of a first base station and a second portion of the selected ones of the plurality of OFDM wireless communication devices are within a coverage range of a second base station, the method further comprising:
　instructing the first portion of the plurality of OFDM wireless communication devices to receive data using the first set of OFDM tones wherein each of the first portion of the plurality of OFDM wireless communication devices participating in the group call is configured to use the first set of OFDM tones to receive the group call data;
　instructing the second portion of the plurality of OFDM wireless communication devices to receive data using the second set of OFDM tones wherein each of the second portion of the plurality of OFDM wireless communication devices participating in the group call is configured to use the second set of OFDM tones to receive the group call data;
　the first portion of the plurality of OFDM wireless communication devices receiving the group call data from the first base station using the first set of OFDM tones; and
　the second portion of the plurality of OFDM wireless communication devices receiving the group call data from the second base station using the second set of OFDM tones.

23. The method of claim 22 wherein the first set of OFDM tones are selected from a set of available OFDM tones and are non-contiguous OFDM tones.

24. The method of claim 22 wherein the first set of OFDM tones and the second set of OFDM tones are the same set of OFDM tones.

* * * * *